United States Patent Office 3,560,586
Patented Feb. 2, 1971

---

3,560,586
PROCESS FOR DECOMPOSING 4,4-DIMETHYL-m-DIOXANE INTO ISOPRENE
Walter Kronig, Leverkusen, Wulf Schwerdtel, Cologne-Stammheim, Paul Losacker, Leichlingen, and Bodo Weicht, Leverkusen, Germany, assignors to Farbenfabriken Bayer Aktiengesellschaft, Leverkusen, Germany
No Drawing. Filed June 10, 1969, Ser. No. 832,002
Claims priority, application Germany, Nov. 29, 1968,
P 18 11 655.7
Int. Cl. B01j *11/82;* C07c *1/20, 1/100*
U.S. Cl. 260—681                    7 Claims

ABSTRACT OF THE DISCLOSURE 4,4-dimethyl-m-dioxane is decomposed into isoprene in the gaseous phase in a fluidized bed over a catalyst containing phosphoric acid and prepared by suspending a silicic acid filler having a specific surface of 30 to 200 m.$^2$/g. and a kaolinite, montmorillonite or attapulgite clay in an aqueous stable silicic acid sol having a specific surface area of 150 to 400 m.$^2$/g. (dry basis); adding to the resulting suspension a sufficient amount of an aqueous suspension of magnesium oxide to set the suspension into beads; drying the beads; heating the beads to 500 to 1,000° C. for at least 10 minutes; adding thereto 5 to 30% phosphoric acid; and further heating them to 300 to 650° C.

---

This invention relates to a process for decomposing 4,4-dimethyl-m-dioxane into isoprene.

It is known that 4,4-dimethyl-m-dioxane can be decomposed into isoprene in the presence of catalysts which contain phosphoric acid. The decomposition may be carried out in the gaseous phase using the known arrangements of catalysts such as fixed bed catalysts or a moving bed or fluidised bed.

We have found that the decomposition of 4,4-dimethyl-m-dioxane into isoprene in the gaseous phase using the fluidised bed method and catalysts which contain phosphoric acid is advantageously carried out with a catalyst made by suspending a silicic acid filler or a filler which mainly contains silicic acid and which has a specific surface area of 30–200 m.$^2$/g. together with a clay mineral consisting of a kaolinite, montmorillonite or attapulgite clay in an aqueous, stable silicic acid sol which has a specific surface of 150–400 m.$^2$/g.; gelling the resulting suspension into beads in known manner by the addition of relatively small quantities of an aqueous magnesium oxide suspension; drying the beads; heating them to 500–1,000° C. for at least 10 minutes; and then adding 5–30% phosphoric acid and heating the beads to 300–650° C.

The catalyst is prepared from an aqueous, stable silica sol which has a specific surface of 150–400 m.$^2$/g. and which has been prepared in known manner. Silicic acid fillers or fillers which mainly contain silicic acid and which have a specific surface of 30–200 m.$^2$/g. are introduced into this sol. Silicic acid fillers or fillers which mainly contain silicic acid are here understood to mean synthetic silicic acids of large surface area which have been obtained by precipitation from a sodium silicate solution and which have a flocculent secondary structure. The precipitation from the sodium silicate solution may be carried out with acids, the fillers obtained being practically free from metal compounds. Alternatively, the precipitation may be carried out with solutions of alkaline earth metal salts or aluminum salts, in which case the fillers obtained contain the corresponding metal oxides, especially CaO and Al$_2$O$_3$. The fillers, which have a specific surface of 30–200 m.$^2$/g., consist of loose flakes which have a diameter in the range of from 1 to 15μ.

In addition to the fillers which contain silicic acid, clay minerals are also suspended in the aqueous, stable silicic acid sol. Clay minerals which are especially suitable for this purpose are kaolinite, montmorillonite or attapulgite clays. The clay minerals used are preferably not the crude, impure materials but worked up, elutriated materials. Suitable commercial products in the case of kaolins are, for example, the elutriated, kaolin-rich products known as China clay. A suitable source of montmorillonite clays are, for example, the commercially available bentonites.

The quantity of substances suspended in the silica sol is so calculated that, in addition to its SiO$_2$ content, the silica sol contains 20–60%, preferably 35–50%, of silicic acid fillers and 5–30%, preferably 15–25%, of clay minerals, the percentages being based on the anhydrous substances.

The conversion of the suspensions into bead granulates is carried out in known manner, e.g. by the addition of a small quantity of an aqueous suspension of finely divided magnesium oxide as a gelling reagent and dropwise distribution of the suspension in an organic phase until sol-gel conversion takes place. The breaking up into small droplets which is necessary for the preparation of catalyst carriers for fluidised beds may be achieved with centrifugal discs or similar devices which accelerate the liquid film by centrifugal forces. The finished catalyst should be in the form of balls of 0.2–2 mm., and preferably 0.3–1.5 mm., diameter and as far as possible uniform in size.

The granulates obtained are dried and annealed at 500° C.–1,000° C. for at least 10 minutes. They have a specific surface of 40–100 m.$^2$/g.

After cooling, the granulates are treated with 5–30% phosphoric acid and then are heated to 300–650° C., but, if desired, the addition of phosphoric acid may be carried out in the reactor, for example, by spraying aqueous solutions of phosphoric acid into the granulate which is in the reactor in a fluidised state at an elevated temperature, preferably using steam as a distributing agent and as a fluidising gas for the granulate. It is also possible to introduce the phosphoric acid in the form of its esters, for example esters of alcohols or phenols, triisobutyl phosphate being especially suitable because on decomposition it yields isobutene which is present in any case.

The finished catalysts generally have specific surfaces of 25–50 m.$^2$/g., and specific surfaces e.g. of 10–30 m.$^2$/g. adjust in the circulating catalyst.

The gases or vapours leaving the reaction chamber in the course of the decomposition reaction carry small amounts of phosphoric acid so that it is advisable to compensate for the loss of phosphoric acid by supplying fresh phosphoric acid, mainly in the form of its esters.

The material used as a starting material is a product which has been obtained by reacting i-butene with formaldehyde which contains, in addition to 4,4 - dimethyl - m-dioxane, small quantities of corresponding enols and glycols as well as tert. butanol or fractions thereof. The following are mentioned as examples of enols and glycols: 1 - hydroxy - 3 - methylbutene-3; 1-hydroxy-3-methylbutene - 2; 1 - hydroxy - 3-methylbutene-1; and 3-methylbutane diol-1,3.

The decomposition of the dioxane into isoprene in the gaseous phase in the presence of the above described fluidised catalysts may be carried out at ordinary or slightly elevated pressure at temperatures e.g. of 200–400° C., advantageously 250–300° C. It is advantageous to add steam to the dioxane which is to be decomposed, in quantities of about 10–100, preferably 20–50, parts by weight of water for every 100 parts by weight of the dioxane introduced into the reaction. Thus, for example, one may use hourly throughputs of dioxane of 0.3–2, advantageously 0.7–1.2 kg., for every litre of the reaction volume which is filled with fluidised catalyst. Suitable residence times of the reactants in the fluidised bed are, for example, 0.3–3 and preferably 0.5–2 seconds. It is advisable to adjust the conditions in such a way within the given limits, that 50–100% and preferably 80–95%, of the dioxane introduced is converted in a single pass through the reaction volume.

It may be advantageous to arrange baffles in the reaction chamber to promote uniform mixing of the gases and fluidised catalyst.

Heated liquids or gases may be passed through these baffles, in particular through tubular baffles, thereby introducing part of the heat required for the reaction into the system. The liquids used are known heat-transmitting liquids such as diphenyl, but one may also use steam under such a pressure that the steam condenses in the tubes at the required reaction temperature so that the heat of condensation can also be utilised.

Minor quantities of high molecular weight carbon-containing products may become deposited on the catalyst particles in the course of the decomposition reaction, thereby reducing the catalytic activity. It is therefore advisable continuously to remove part of the catalyst contents from the reactor and to burn off the carbon-containing products deposited thereon by treatment with oxygen-containing gases at 500–700° C., preferably in a fluidised bed, whereupon the regenerated catalyst may be returned to the reaction volume. When removing the catalyst from the reactor, care should be taken to ensure that the adsorbed volatile constituents are removed by stripping with steam and returned to the reaction gases.

The rate of circulation of catalyst may be 3–10 and is preferably 4–8 parts by weight of catalyst per part by weight of dioxane introduced into the reactor, per unit time.

The reactors used may be for example shaft furnaces in which the fluidised bed may have a height, e.g. of 0.05–3, and preferably 1–2, metres. The diameter of the shaft furnace may, e.g., be 0.05–5 metres. The reactants should preferably be distributed as uniformly as possible over the whole cross-section of the reactor. For the introduction of the reactants: dioxane and steam, it is suitable to use, e.g., horizontal tubes with outlets for the reactants. The tubes for the introduction of dioxane are advantageously equipped with a cooling jacket to prevent thermal decomposition of the reactants and separation of higher boiling products already occurring in the tubes. The tubes for the introduction of steam may be arranged below the tubes for the introduction of dioxane in order to keep the lower part of the reactor free from organic vapours which in this region would decompose on the catalyst particles in an unwanted manner.

In order to maintain the fluidised bed in the reactor, the reactants are introduced into the reactor from the bottom, rise, and leave the reactor at the top.

In principle, the catalyst may be passed through the reactor either in the same direction as the reactants or in counter-current thereto. It has been found that especially advantageous results are obtained if the catalyst and reactants are passed together upwards through the reactor. Separation of the catalyst from the reaction products is carried out in the upper part of the reactor and the amount of catalyst required for circulation is removed from the top of the reactor and introduced in some suitable manner into the regenerator. The hot catalyst from the regenerator may be introduced from the outside at the bottom end of the reactor so that it passes from the outside inwards or, alternatively, it may be passed downwards through the fluidised bed layer in a central tube and introduced into the reactor below the point of admission of dioxane and then distributed from the inside outwards. Combinations of these two methods may also be used.

After separation of the catalyst, the reaction products leave the reactor and may then be passed through a cyclone separator to remove catalyst dust which may have been carried along with them, and then they are cooled rapidly by introducing them into a stream of reaction-water which is kept at a temperature of 40–90° C., preferably 50–80° C., where unreacted starting material and most of the steam introduced condenses. In addition, most of the formaldehyde formed is dissolved in this stream. The gases leaving the water stream are cooled in a second quenching system to 0–30° C., preferably 5–10° C. In the second quenching system most of the isoprene formed during the reaction is condensed, there most of the isoprene formed is condensed. The gases leaving the system are washed free from formaldehyde in a countercurrent wash, compressed, condensed and directly conveyed to a $C_4/C_5$ distillation. The organic phases obtained in the two cooling circuits are distilled together, unreacted starting material being obtained as a sump product and returned to the decomposition process. The head product of this distillation is washed free from formaldehyde with water and returned to the above-mentioned $C_4/C_5$ distillation. Subsequent distillation to pure isoprene is carried out in known manner. The washing waters are advantageously returned to the cooling cycles.

The technical importance of the process described above lies mainly in the conversion of 4,4-dimethyl-m-dioxane into isoprene. The dioxane put in the process is prepared from isobutene and formaldehyde in known manner, e.g. using sulphuric acid as a catalyst for this condensation reaction. It is especially suitable to use as a catalyst for the condensation reaction cation exchangers which are based on cross-linked vinyl aromatic polymers and which contain sulphonic acid groups. The reactants, i.e. isobutene and formaldehyde, may, e.g., be passed through a series of reactors with or without interposed separating vessels, the hydrocarbon layer being drawn off the separating vessels and separated by distillation into unconverted hydrocarbons and conversion products, and the hydrocarbons removed from the separating vessels being replaced by fresh or returned hydrocarbons.

Pure dioxane may be obtained by distillation from the crude dioxane which has been obtained by the process described above, and this pure dioxane may then be introduced into the decomposition reaction. A certain amount of tert. butanol is formed as a by-product of the preparation of dioxane, due to hydration of isobutene. It is advantageous not to separate this tert. butanol from the dioxane but to introduce it into the decomposition reaction together with the dioxane, the presence of tert. butanol and of the isobutene formed therefrom in the reactor being advantageous for the progress of the decomposition reaction.

Other reaction products in addition to 4,4-dimethyl-m-dioxane and tert. butanol are formed by the reaction of isobutene with formaldehyde, namely enols and diols and other higher boiling products. The higher boiling products may be removed not only by ordinary distillation but also in the course of the decomposition of dioxane by interposing an evaporator in front of the reactor. The crude dioxane is then introduced into the evaporator and the dioxane and lower boiling products are evaporated by introducing super-heated steam into the evaporator and circulating the contents of the evaporator through a heater, and the evaporated dioxane and lower boiling products are then immediately introduced into the reactor. The high boiling products are then drawn off at the lower end of the evaporator. It is advantageous to introduce the crude dioxane into the fluidised bed, preferably introducing it in the liquid form into the fluidised bed through the inlet tubes mentioned above and ensuring that the liquid product is finely distributed on leaving the nozzles of the inlet tube.

As already mentioned above, glycols are also formed in the course of the above-described preparation of dioxane; these glycols are partly dissolved in the aqueous phase of the preparation of dioxane. The higher-than-water volatile by-products dissolved in the aqueous phase may also be put into the decomposition process after they have been concentrated, preferably after first distributing them in the crude dioxane.

The invention is illustrated by the following example.

EXAMPLE (a) The catalyst used for the decomposition of the crude dioxane was prepared as follows:

To prepare the carrier, the following ingredients were suspended in an aqueous silica sol (density 1.20 g./ml., 30% by weight $SiO_2$) which had a specific surface according to BET of 200 m.$^2$/g., using a high speed stirrer:

(1) A silicic acid filler which had been obtained by precipitating a sodium silicate solution with a calcium chloride solution which was acidified with hydrochloric acid and which contained 8% of CaO and had a BET specific surface of 50 m.$^2$/g., a sedimentation volume in toluene of 40 ml. and an average particle diameter according to Andreasen of 7.5$\mu$; and (2) Kaolin with an average particle diameter according to Andreasen of 6.3$\mu$ in such quantities that the finished dry catalyst which was free from phosphoric acid contained 47.6% of $SiO_2$ from the silica sol, 36.7% of the silicic acid filler and 15.7% of kaolin.

100 parts by volume of this suspension and 10 parts by volume of an aqueous suspension of magnesium oxide which contained 80 g. of MgO per litre were introduced together into a mixing vessel from which the resulting mixture was run into a distributor apparatus. This apparatus consisted of a vessel which widened out at the bottom in the form of a cone and which had a row of perforations just above the bottom which was situated a few centimetres above the liquid surface of a column filled with o-dichlorobenzene. The suspension mixture solidified into beads of from 0.5 to 2 mm. as a result of the sol-gel conversion. The granulate was freed from o-dichlorobenzene, dried in a current of air and then heated at 700° C. for two hours. The finished granulate had a specific surface of 94 m.$^2$/g. according to BET, and an abrasion resistance of 0.8% and a water uptake capacity of 54 g./100 g. of granulate.

For further preparation of the catalyst, the granulate was steeped in phosphoric acid so that the finished dry catalyst heated to 600° C. contained 18% by weight of phosphoric acid. The finished catalyst had a specific surface area of 32 m.$^2$/g. and an abrasion resistance of 0.5%.

(b) The reactor used for the decomposition of crude dioxane consisted of a tube of stainless steel which tapered conically towards the bottom and had a diameter of 80 mm. and a length of 1,200 mm. At the top, the tube widened out in the form of a cone to a diameter of 135 mm., with a length of 600 mm. Baffles were arranged inside the reactor to ensure uniform distribution of gases and solids. The catalyst was kept in a fluidised state in the reactor by the gaseous reactants. A nozzle for the supply of steam was arranged at the lower end of the cone of the reactor. A pipe connection was arranged at the side of the upper end of the cone for the supply of the catalyst which was circulated. Above the connection for the supply of catalyst, two nozzles were arranged for the supply of crude dioxane which evaporated as soon as it was brought into contact with the hot catalyst and steam. The reactants—dioxane and steam—rised through the catalyst layer and the dioxane decomposed. A level of catalyst was maintained in the upper, widened part of the reactor, and separation of the gaseous reaction products from the catalyst took place there. The catalyst, which was supplied from a regenerative apparatus, entered hot into the reactor, ascended the reactor together with the reactants, left the reactor in the wide, upper part, and was freed from organic products adhering thereto by stripping with steam. The organic products removed were added to the reaction products and the catalyst reached the regenerative apparatus through a lift. In the regenerative apparatus, it was heated to 600–620° C. by the addition of oxygen-containing combustion gases and it thereupon returned to the reactor at the bottom, thus completing the cycle. The sensible heat from the catalyst supplied from the regenerator was used for evaporating the dioxane, heating the reactants and providing the heat for the decomposition. 10 kg. of crude dioxane which contained 12% of tert. butanol, 63% of 4,4-dimethyl-1,3-dioxane and 25% of higher boiling products, mainly enols and diols, were sprayed per hour at a temperature of 25–30° C. through the nozzles arranged as mentioned above at the side of the continuously operating apparatus onto the catalyst which was supplied from the regenerator at a temperature of 510° C. 3.9 kg. of steam per hour were introduced at a temperature of 400° C. through the nozzle in the lower cone of the reactor. The catalyst was passed through the reactor at the rate of 53 kg. per hour. The temperature in the reactor was 260–270° C. and the pressure was 0.2–0.3 excess atmospheres.

The circulating catalyst loses some phosphoric acid in the course of time so that it has to be replaced. 0.3% of tri-iso-butyl phosphate was therefore added to the crude dioxane and decomposed under the reaction conditions into isobutene and phosphoric acid. A steady concentration of phosphoric acid of 9–13% is thereby established in the circulating catalyst. A specific surface of 15–20 m.$^2$/g. is established in the circulating catalyst. In a single passage through the reactor, the catalyst takes up to 0.3% of coke-like products, which have to be burned off in the regenerator.

The gases leaving the top of the reactor are passed through a cyclone separator to remove catalyst dust which has been carried along with them, and they are then chilled with about 350 litres/hour of circulating reaction water at 50° C. in a first quencher, the steam and higher boiling products being condensed. The major portion of formaldehyde formed is already taken up by the water at this stage. The 50–60° C. hot residual gases are then further cooled in a second quencher wherein water (about 400 l.) is recirculated at a temperature of 10° C. The major portion of the isoprene formed is condensed in the circulating water in the second quencher. The residual gas, which consists mainly of isobutene, is washed with water in a bubble tray to remove the remaining formaldehyde and is compressed to 5 atmospheres gauge in a compressor and condensed.

A part from each of the two quenching cycles is branched off into a tranquillising zone from which the aqueous and organic phases are removed separately. The aqueous phase from the tranquillising zone of the second quenching cycle is introduced into the first quenching cycle, and the aqueous phase of the tranquillising zone of the first quenching cycle, which contains about 15–16% of formaldehyde and 2–3% of dioxane, may immediately be used again for the preparation of dioxane, thereby returning the formaldehyde. The organic phases of the tranquillising zones of both quenching cycles are together introduced into a distillation apparatus in which $C_4$ and $C_5$ fractions are removed at the top, higher boiling by-products and unreacted dioxane remaining in the sump.

The head product of the distillation is combined with the condensate from the compressor and washed free from formaldehyde in a second washing column. Further separation of $C_4$ and high grade purification of the isoprene obtained are carried out in known manner.

The washing water from the last-mentioned washing is added to the washing water before the compressor and from there is enters the cycle of the second quencher.

Under these conditions, 86% of 4,4-dimethyl-m-dioxane, 99.5% of tert. butanol and all higher boiling products were converted per hour, and 2.4 kg. of isoprene which contained about 0.3% of n-butene, 1.5 kg. of isobutene and 1.61 kg. of formaldehyde in addition to 1.0 kg. of unreacted dioxane and higher boiling products were obtained per hour. This corresponds to a selectivity for isoprene of 75.3%, based on converted pure dioxane and a formaldehyde selectivity of 96.5%.

(c) The crude dioxane introduced into the reactor in Example 1(b) was prepared as follows:

In a system which contained 6 vessels with stirrers, 37% aqueous formaldehyde solution was reacted at a temperature of 110–115° C. and a pressure of 20–25 atmospheres gauge with i-butene which was in the form of a $C_4$ fraction which contained 45.4% of i-butene. The catalyst used was an acid cation-exchanger based on polystyrene which had been crosslinked with 2% by weight of divinyl benzene. This catalyst was used in a particle size of 80 to 500$\mu$ and at a concentration of 30 vols. percent based on the aqueous phase. A separator was provided behind every two vessels in which the aqueous formaldehyde solution was separated at full pressure from the dioxane-containing hydrocarbon layer. The upper phase was separated in a $C_4$ distillation apparatus into unreacted $C_4$-hydrocarbons as head product and crude dioxane as sump product. The head product of this column was in part returned to the vessel equipped with stirrers which followed the separating vessel. The aqueous phase was forced by pressure through the entire cascade. Behind the last separator, the pressure was released, the catalyst was removed by centrifuging and returned to the first vessel, and the waste water which was free from catalyst was extracted with the $C_4$ hydrocarbons used as starting material to remove dissolved reaction products. The waste water leaving the plant had a residual formaldehyde content of 0.4, and the mixture of residual $C_4$ hydrocarbons leaving the $C_4$-distillation apparatus had an isobutene content of 17%.

The crude dioxane obtained as sump product in the aforesaid distillation was put without further treatment into the reaction described in Example 1(b).

What we claim is:

1. A process for decomposing 4,4-dimethyl-m-dioxane into isoprene in the gaseous phase in a fluidized bed in the presence of a catalyst containing phosphoric acid and prepared by suspending a silicic acid filler consisting essentially of silicic acid which filler has a specific surface of 30–200 m.²/g. together with a kaolinite, montmorillonite or attapulgite clay in an aqueous, stable silicic acid sol which has a specific surface area of 150–400 m.²/g. (on a dry basis); adding to the resulting suspension a sufficient amount of an aqueous suspension of magnesium oxide to set the suspension into beads; drying the beads; heating the beads to 500–1,000° C. for at least 10 minutes; adding thereto 5–30% phosphoric acid; and further heating them to 300–650° C.

2. A process according to claim 1, in which the starting material used is a product or fractions thereof which has been obtained by reacting i-butene with formaldehyde and which in addition to 4,4-dimethyl-m-dioxane, contains minor quantities of corresponding enols and glycols as well as tertiary butanol.

3. A process according to claim 1, in which the dioxane is introduced into the fluidised bed layer through a cooled distributor assembly.

4. A process according to claim 1, in which the catalyst is used in the form of balls measuring 0.2–2 mm., preferably 0.3–1.5 mm.

5. A process according to claim 1, in which the catalyst is circulated between a reaction chamber for decomposing dioxane and a regenerative chamber for burning off the carbon-containing products which have been deposited on the catalyst in the reactor, the catalyst being circulated in an amount of 3–10 parts by weight per part by weight of dioxane which is introduced into the reactor per unit time.

6. A process according to claim 1, in which the dioxane and catalyst are passed together upwards through the reactor and separation between the catalyst and the reaction product is carried out at the top of the reactor; the separated catalyst being advantageously freed from adhering volatile organic compounds by stripping with inert gases, advantageously steam, these volatile organic products being then supplied to the reaction products.

7. A process according to claim 1, in which after the removal of the catalyst, the decomposition products are passed through two streams of water, the temperature of the circulating water in the first stream being kept at 40–90° C. and that in the second at 0–30° C.

References Cited

UNITED STATES PATENTS

| | | | |
|---|---|---|---|
| 3,146,278 | 8/1964 | Habeshaw et al. | 260—681 |
| 3,284,533 | 11/1966 | Mitsutami | 260—681 |
| 3,437,711 | 4/1969 | Yanagita et al. | 260—681 |

DELBERT E. GANTZ, Primary Examiner

G. E. SCHMITKONS, Assistant Examiner

U.S. Cl. X.R.

252—435